United States Patent
Tsai et al.

(10) Patent No.: US 8,971,466 B2
(45) Date of Patent: Mar. 3, 2015

(54) RECEIVER WITH INPHASE-QUADRATURE IMBALANCE COMPENSATION AND INPHASE-QUADRATURE IMBALANCE COMPENSATION METHOD THEREOF

(71) Applicant: Institute for Information Industry, Taipei (TW)

(72) Inventors: Tsung-Yu Tsai, Tainan (TW); Chun-Che Chien, Taipei (TW); Shu-Tsz Liu, Taipei (TW); You-Hsien Lin, Taipei (TW); Terng-Yin Hsu, Zhubei (TW); Wei-Chi Lai, Luzhu Township (TW); Shao-Ying Yeh, New Taipei (TW)

(73) Assignee: Institute for Information Industry, Taipei (TW)

( * ) Notice: Subject to any disclaimer, the term of this patent is extended or adjusted under 35 U.S.C. 154(b) by 79 days.

(21) Appl. No.: 13/935,196

(22) Filed: Jul. 3, 2013

(65) Prior Publication Data

US 2014/0307839 A1 Oct. 16, 2014

(30) Foreign Application Priority Data

Apr. 16, 2013 (TW) .............................. 102113432 A

(51) Int. Cl.
*H03D 1/04* (2006.01)
*H04L 27/26* (2006.01)
(52) U.S. Cl.
CPC ........ *H04L 27/2688* (2013.01); *H04L 27/2657* (2013.01)
USPC ...................................................... 375/346

(58) Field of Classification Search
CPC ............ H04L 27/3863; H04L 27/2647; H04L 25/03019; H04L 27/364; H03D 3/009
USPC ................. 375/316, 340, 342, 346, 348–349; 455/63.1, 67.13, 114.2
See application file for complete search history.

(56) References Cited

U.S. PATENT DOCUMENTS

| | | | |
|---|---|---|---|
| 7,251,291 B1* | 7/2007 | Dubuc et al. | 375/296 |
| 2004/0095993 A1* | 5/2004 | Liu et al. | 375/219 |
| 2005/0227642 A1* | 10/2005 | Jensen | 455/127.1 |
| 2011/0026570 A1* | 2/2011 | Feng et al. | 375/224 |
| 2011/0051790 A1* | 3/2011 | Honda | 375/224 |
| 2011/0182335 A1* | 7/2011 | Pratt et al. | 375/224 |
| 2013/0148767 A1* | 6/2013 | Dubey et al. | 375/346 |
| 2014/0185510 A1* | 7/2014 | Chu et al. | 370/311 |
| 2014/0307839 A1* | 10/2014 | Tsai et al. | 375/349 |

* cited by examiner

*Primary Examiner* — Khanh C Tran
(74) *Attorney, Agent, or Firm* — Skaar Ulbrich Macari, P.A.

(57) ABSTRACT

A receiver with Inphase-Quadrature (I-Q) imbalance compensation and an I-Q imbalance compensation method thereof are provided. The receiver chooses a first receiving signal which includes a first data and a first noise, as well as a second receiving signal which includes a second data and a second noise from a plurality of receiving signals. The first data have a first positive frequency data and a first negative frequency data, while the second data have a second positive frequency data and a second negative frequency data. The receiver calculates an I-Q imbalance compensation parameter according to the first receiving signal and the second receiving signal, and compensates for a third receiving signal according to the I-Q imbalance compensation parameter. The I-Q imbalance compensation method is applied to the receiver to implement the aforesaid operations.

10 Claims, 2 Drawing Sheets

RECEIVER WITH INPHASE-QUADRATURE IMBALANCE COMPENSATION AND INPHASE-QUADRATURE IMBALANCE COMPENSATION METHOD THEREOF

PRIORITY

This application claims priority to Taiwan Patent Application No. 102113432, filed on Apr. 16, 2013, which is hereby incorporated herein by reference in its entirety.

FIELD

The present invention provides a receiver with an Inphase-Quadrature (I-Q) imbalance compensation and an I-Q imbalance compensation method thereof. More particularly, the present invention provides a receiver with an I-Q imbalance compensation and an I-Q imbalance compensation method thereof adapted for cases where there are a lot of noise and low-pass filter (LPF) mismatches.

BACKGROUND

As people's demands for wireless high-speed transmission increase, oscillating frequencies of radio frequency (RF) oscillators must be increased correspondingly. However, the increase of oscillating frequencies of RF oscillators also worsens the Inphase-Quadrature (I-Q) imbalance effect of the RF oscillators.

In wireless network communication systems, there is an amplitude imbalance and/or phase imbalance between the inphase channel and quadrature channel of the receiving end. As a result, image aliasing occurs in Orthogonal Frequency-Division Multiplexing (OFDM) systems, which affects the signal quality of the wireless communication system. Therefore, it is difficult for a wireless communication system without an I-Q imbalance compensation to provide desirable communication quality.

Conventional I-Q imbalance compensation methods may be generally divided into the following two categories: (1) performing detection and making compensation according to a time-domain or frequency-domain preamble signal or pilot signal that is already known; and (2) making compensation by using a time-domain filter. However, the former is known to have a high computational complexity, which tends to consume too many hardware resources. The latter is known to have a long latency, which tends to cause a long waiting time.

To compensate for the I-Q imbalance effect in modern wireless communication systems due to high-speed wireless transmission, Taiwan Invention Patent Application No. 101105226 (Publication No.:201336240 ), whose corresponding US application is U.S. patent application Ser. No. 13/443,281 (Publication No.:2013/0216004A1), has disclosed a receiver with an I-Q imbalance compensation and an I-Q imbalance compensation method thereof which features a low computational complexity and a short latency. However, the receiver and I-Q imbalance compensation method thereof disclosed in this Taiwan Invention Patent Application fail to take into account noises and low-pass filter (LPF) mismatches on the I-Q imbalance compensation.

Accordingly, it is important to provide a solution that takes into account noises and the LPF mismatches, presents a low computational complexity and a short latency, and can still effectively compensate for the I-Q imbalance effect in modern wireless communication systems due to high-speed wireless transmission.

SUMMARY

An objective of certain embodiments of the present invention is to provide a receiver with an Inphase-Quadrature (I-Q) imbalance compensation and an I-Q imbalance compensation method thereof, which are adapted to take into account noises and low-pass filter (LPF) mismatches, present a low computational complexity and a short latency, and can still effectively compensate for the I-Q imbalance effect in modern wireless communication systems due to high-speed wireless transmission.

In particular, the present invention effectively reduces the influence of noises and LPF mismatches on the I-Q imbalance compensation by virtue of the characteristics of two already-known signals that satisfy specific conditions. Therefore, even when taking into account noises and LPF mismatches, the receiver and I-Q imbalance compensation method thereof disclosed in the aforesaid Taiwan Invention Patent Application can still present a low computational complexity and a short latency and effectively compensate for the I-Q imbalance effect in the modern wireless communication systems due to high-speed wireless transmission.

To achieve the aforesaid objective, certain embodiments of the present invention provide a receiver with an Inphase-Quadrature (I-Q) imbalance compensation. The receiver comprises a calculation unit and a compensation unit electrically connected to the calculation unit. The calculation unit is configured to choose a first receiving signal and a second receiving signal from a plurality of receiving signals. The first receiving signal comprises a first data and a first noise, while the second receiving signal comprises a second data and a second noise. The first data includes a first positive frequency data and a first negative frequency data, while the second data includes a second positive frequency data and a second negative frequency data.

The calculation unit calculates an I-Q imbalance compensation parameter according to the first receiving signal and the second receiving signal, while the compensation unit compensates for a third receiving signal according to the I-Q imbalance compensation parameter. The first receiving signal, the second receiving signal and the third receiving signal have the same frequency. Each of the first positive frequency data, the first negative frequency data, the second positive frequency data and the second negative frequency data is not equal to zero. The product of the first positive frequency data and the conjugation of the second negative frequency data is not equal to the product of the conjugation of the first negative frequency data and the second positive frequency data. The product of the first positive frequency data and the first negative frequency data is equal to a negative value of the product of the second positive frequency data and the second negative frequency data.

To achieve the aforesaid objective, certain embodiments of the present invention provide an I-Q imbalance compensation method for use in a receiver. The receiver comprises a calculation unit and a compensation unit electrically connected to the calculation unit. The I-Q imbalance compensation method comprises the following steps:

(a) choosing a first receiving signal and a second receiving signal from a plurality of receiving signals by the calculation unit, wherein the first receiving signal comprises a first data and a first noise, the second receiving signal comprises a second data and a second noise; the first data includes a first positive frequency data and a first negative frequency data, while the second data includes a second positive frequency data and a second negative frequency data;

(b) calculating an I-Q imbalance compensation parameter by the calculation unit according to the first receiving signal and the second receiving signal, wherein the first receiving signal and the second receiving signal have the same frequency; each of the first positive frequency data, the first negative frequency data, the second positive frequency data and the second negative frequency data is not equal to zero, the product of the first positive frequency data and the conjugation of the second negative frequency data is not equal to the product of the conjugation of the first negative frequency data and the second positive frequency data, and the product of the first positive frequency data and the first negative frequency data is equal to a negative value of the product of the second positive frequency data and the second negative frequency data; and (c) compensating for a third receiving signal by the compensation unit according to the I-Q imbalance compensation parameter, wherein the third receiving signal has the same frequency as the first receiving signal and the second receiving signal.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific example, embodiments, environment, applications or particular implementations described in these embodiments. Therefore, the description of these example embodiments is only for purpose of illustration rather than to limit the present invention. It should be appreciated that in the following embodiments and attached drawings, elements unrelated to the present invention are omitted from depiction, and dimensional relationships among the individual elements in the attached drawings are illustrated only for the ease of understanding, but not to limit the actual scale.

The first embodiment of the present invention is a receiver 1 with an Inphase-Quadrature (I-Q) imbalance compensation. The receiver 1 is configured to receive signals transmitted by a transmitter 9. In this embodiment, both the receiver 1 and the transmitter 9 conform to an Orthogonal Frequency-Division Multiplexing (OFDM) standard. The method in which the receiver 1 and the transmitter 9 communicate and transmit signals in an OFDM system is well-known to those of ordinary skill in the art, and thus, will not be further described herein. It should be appreciated that applying OFDM system as the present system is only intended to illustrate this embodiment, rather than to limit the implementations of the present invention.

Figure 1:
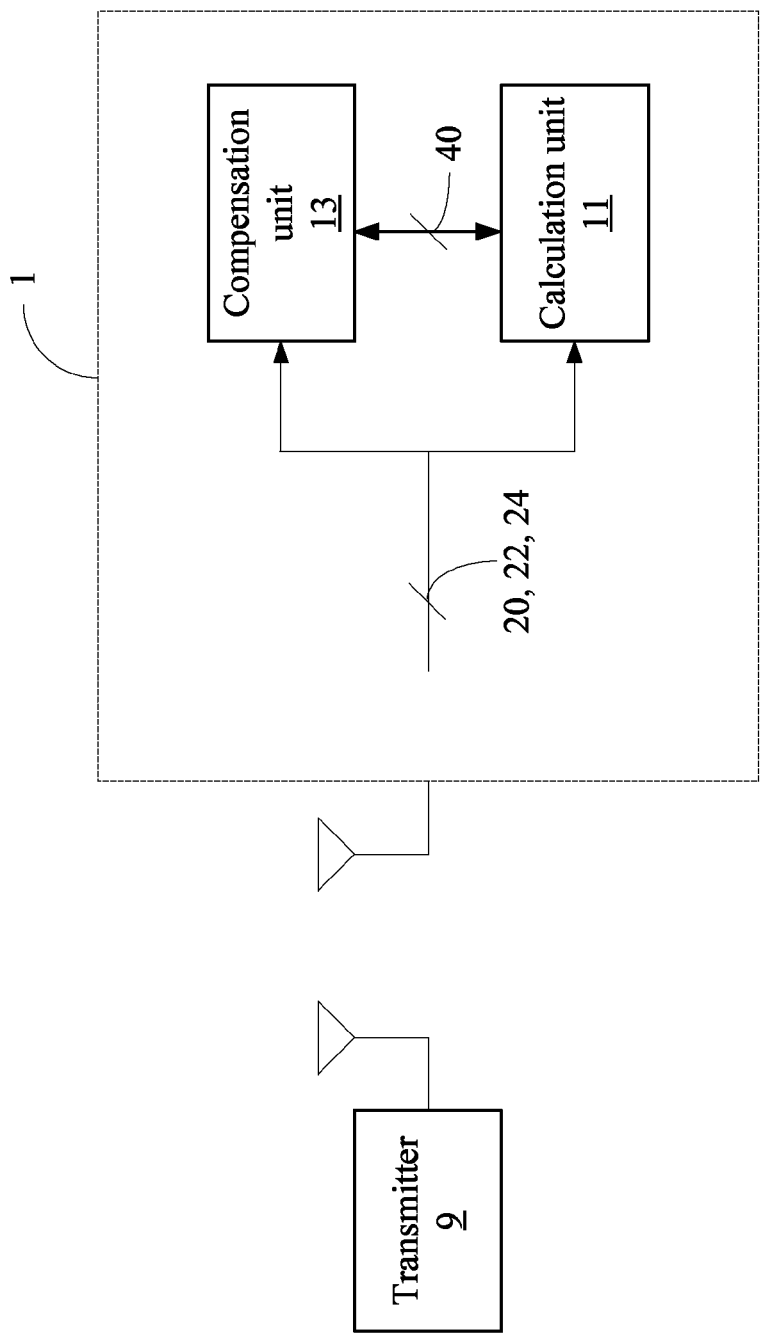
FIG. 1 is a schematic view of a receiver according to the first embodiment of the present invention.

As shown in FIG. 1, the receiver 1 comprises a calculation unit 11 and a compensation unit 13 electrically connected to the calculation unit 11. The calculation unit 11 is configured to choose a first receiving signal 20 and a second receiving signal 22 from a plurality of receiving signals. Frequencies of the first receiving signal 20 and the second receiving signal 22 are substantially the same or similar to each other. For the receiver 1, the first receiving signal 20 and the second receiving signal 22 are each an already-known signal such as a preamble signal, a synchronization signal, a reference signal and a pilot signal or the like. Therefore, the inherent characteristics of the first receiving signal 20 and the second receiving signal 22 and the relationship between the first receiving signal 20 and the second receiving signal 22 are also already known to the receiver 1.

The first receiving signal 20 comprises a first data and a first noise. The second receiving signal 22 comprises a second data and a second noise. The first data includes a first positive frequency data and a first negative frequency data, while the second data includes a second positive frequency data and a second negative frequency data. It should be appreciated that both the first noise and the second noise can be substantially considered to comprise various noises and various interferences rather than simply represent a certain kind of noise. In terms of frequencies, the first noise may also comprise a first positive frequency noise and a first negative frequency noise, while the second noise may also comprise a second positive frequency noise and a second negative frequency noise.

Since the first receiving signal 20 and the second receiving signal 22 are already known to the receiver 1, the transmitter 9 may appropriately design the first receiving signal 20 and the second receiving signal 22 so that they satisfy specific conditions. The calculation unit 11 of the receiver 1 can calculate an I-Q imbalance compensation parameter 40 needed by the compensation unit 13 according to the inherent characteristics of and the relationship between the first receiving signal 20 and the second receiving signal 22 designed by the transmitter 9.

In this embodiment, the first receiving signal 20 and the second receiving signal 22 designed by the transmitter 9 satisfy the following conditions: each of the first positive frequency data, the first negative frequency data, the second positive frequency data and the second negative frequency data is not equal to zero; the product of the first positive frequency data and the conjugation of the second negative frequency data is not equal to the product of the conjugation of the first negative frequency data and the second positive frequency data; and the product of the first positive frequency data and the first negative frequency data is equal to a negative value of the product of the second positive frequency data and the second negative frequency data.

As long as the first receiving signal 20 and the second receiving signal 22 can satisfy the aforesaid conditions, the I-Q imbalance compensation parameter 40 calculated by the calculation unit 11 according to the first receiving signal 20 and the second receiving signal 22 that satisfy the aforesaid conditions presents a low computational complexity and a short latency and can be effectively used to compensate for the I-Q imbalance effect in the modern wireless communication systems due to high-speed wireless transmission no matter whether the receiver 1 suffers from a lot of noises or a mismatch between a low-pass filter response of an inphase channel and a low-pass filter response of a quadrature channel of the receiver 1.

This embodiment will be further described below with reference to a process of deriving equations. For the ease of description, it is assumed that there is no noise. Then, in an Orthogonal Frequency-Division Multiplexing (OFDM) system, the receiver 1 receives, by an antenna, a fundamental-frequency signal with a positive frequency k, which can be expressed as follows after being subjected to the Fast Fourier Transform (FFT):

$$R_3(k) = I_3(k) + jQ_3(k) = \alpha(k)Z_3(k) + \beta(k)Z_3^*(-k) \quad (1)$$

$$\alpha(k) = \frac{[H_{I_3}(k) + H_{Q_3}(k)ge^{-j\theta}]}{2}$$

$$\beta(k) = \frac{[H_{I_3}(k) - H_{Q_3}(k)ge^{j\theta}]}{2}$$

where $R_3(k)$ is a third receiving signal 24, $I_3(k)$ is an I-channel component of the I-Q channels, $Q_3(k)$ is a Q-channel component of the I-Q channels, $Z_3(k)$ is a third positive frequency signal comprised in the third receiving signal 24, $Z_3^*(-k)$ is a conjugation of a third negative frequency signal comprised in the third receiving signal 24, g is an amplitude error of the I-Q channels, θ is a phase error of the I-Q channels, and $H_{I_3}(k)$ and $H_{Q_3}(k)$ are low-pass filter (LPF) responses of the I channel and the Q channel respectively. Similarly, the receiver 1 receives, by an antenna, a fundamental-frequency signal with a negative frequency −k, which can also be expressed as follows after being subjected to the FFT:

$$R_3(-k) = I_3(-k) + jQ_3(-k) = \alpha(-k)Z_3(-k) + \beta(-k)Z_3^*(k) \quad (2)$$

Any of the amplitude error g, the phase error θ and the LPF mismatch between the I channel and the Q channel can cause image aliasing in the receiver 1 due to the I-Q channel imbalance effect. In general, the conventional schemes of compensating for the image aliasing caused by the I-Q channel imbalance effect fail to take the influence of the LPF mismatch between the I channel and the Q channel into account. However, the receiver 1 of this embodiment takes the influence of the LPF mismatch between the I channel and the Q channel into account when it compensates the image aliasing caused by the I-Q channel imbalance effect. Furthermore, it can be known from the following derivation that even in the case of an LPF mismatch between the I channel and the Q channel, the receiver 1 of this embodiment can still present a low computational complexity and a short latency and can effectively compensate for the I-Q imbalance effect in the modern wireless communication systems due to high-speed wireless transmission.

Since it is assumed that there is no noise in the current stage, the two already-known signals (i.e., the first receiving signal 20 and the second receiving signal 22) can be expressed as (s(k), s(−k)) and (s(k'), s(−k')) respectively, where s(k) is the first positive frequency data of the first receiving signal 20, s(−k) is the first negative frequency data of the first receiving signal 20, s(k') is the second positive frequency data of the second receiving signal 22, and s(−k') is the second negative frequency data of the second receiving signal 22. When the frequency k and the frequency k' are similar to or the same as each other, an assumption can be made that α(k) and β(k) which correspond to the first receiving signal 20 as well as α(k') and β(k') which correspond to the second receiving signal 22 satisfy the following conditions: α(k)≈α(k') and β(k)≈β(k').

For the convenience of description, (s(k), s(−k)) is represented by $(x_1, x_2)$, and (s(k'), s(−k')) is represented by $(y_1, y_2)$ hereinafter. Thereby, the receiving signals that respectively correspond to the first positive frequency data $x_1$, the first negative frequency data $x_2$, the second positive frequency data $y_1$ and the second negative frequency data $y_2$ can be expressed as follows according to the equations (1) and (2):

$$R_p = \begin{bmatrix} R(k) \\ R(k') \end{bmatrix} = \begin{bmatrix} h_1 x_1 & h_2^* x_2^* \\ h_1 y_1 & h_2^* y_2^* \end{bmatrix} \begin{bmatrix} \alpha(k) \\ \beta(k) \end{bmatrix} \quad (3)$$

$$R_n = \begin{bmatrix} R(-k) \\ R(-k') \end{bmatrix} = \begin{bmatrix} h_2 x_2 & h_1^* x_1^* \\ h_2 y_2 & h_1^* y_1^* \end{bmatrix} \begin{bmatrix} \alpha(-k) \\ \beta(-k) \end{bmatrix} \quad (4)$$

where R(k) is the positive frequency component of the first receiving signal 20, R(−k) is the negative frequency component of the first receiving signal 20, R(k') is the positive frequency component of the second receiving signal 22, R(−k') is the negative frequency component of the second receiving signal 22, $h_1$ is a channel response corresponding to the first positive frequency data $x_1$ and the second positive frequency data $y_1$, and $h_2$ is a channel response corresponding to the first negative frequency data $x_2$ and the second negative frequency data $y_2$.

It can be seen from the equations (3) and (4) that values of α(k) and β(k) cannot be calculated if the channel responses $h_1$ and $h_2$ are unknown. However, according to the disclosure of the aforesaid Taiwan Invention Patent Application, the image aliasing caused by the I-Q channel imbalance effect can be eliminated as long as $$\frac{\beta(k)}{\alpha^*(-k)}$$

(for the positive frequency portion) and $$\frac{\beta(-k)}{\alpha^*(k)}$$

(for the negative portion) can be calculated and provided to the compensation unit 13 as the I-Q imbalance compensation parameter 40. Therefore, the calculation of $$\frac{\beta(k)}{\alpha^*(-k)} \text{ or } \frac{\beta(-k)}{\alpha^*(k)}$$

will be further described below.

Taking the calculation of $$\frac{\beta(-k)}{\alpha^*(k)}$$

as an example, two vectors $b_1$ and $b_2$ that satisfy the following conditions must first be derived:

$$b_1^T R_n = C\beta(-k) \quad (5)$$

$$b_2^T R_p = C^* \alpha(k) \quad (6)$$

where C≠0, $b_1 = [b_1(1)\ b_1(2)]^T$ and $b_2 = [b_2(1)\ b_2(2)]^T$. Then, the calculation unit 11 can calculate $$\frac{\beta(-k)}{\alpha^*(k)}$$

according to the following equation:

$$D = \frac{\beta(-k)}{\alpha^*(k)} = \frac{b_1^T R_n}{(b_2^T R_p)^*} \quad (7)$$

Furthermore, it can be seen from Equation (3) that the vectors $b_1$ and $b_2$ must satisfy the following conditions to calculate $$\frac{\beta(-k)}{\alpha^*(k)}:$$

$$x_2{}^*b_2(1) = -y_2{}^*b_2(2), \; b_2 \neq 0 \quad (8)$$

$$x_1 b_1(1) = -y_1 b_1(2), \; b_1 \neq 0 \quad (9)$$

$$b_1(1)x_2{}^* + b_1(2)y_2{}^* = b_2(1)x_1 + b_2(2)y_1 \quad (10)$$

Thus, to make vectors $b_1$ and $b_2$ satisfying the equations (8)-(10) available, the first positive frequency data $x_1$, the first negative frequency data $x_2$, the second positive frequency data $y_1$ and the second negative frequency data $y_2$ must satisfy the following conditions:

$$x_1, x_2, y_1, y_2 \neq 0 \quad (11)$$

$$x_1 y^*{}_2 \neq x^*{}_2 y_1 \quad (12)$$

where Equation (11) means that none of the first positive frequency data $x_1$ and the first negative frequency data $x_2$ of the first receiving signal 20 as well as the second positive frequency data $y_1$ and the second negative frequency data $y_2$ of the second receiving signal 22 is equal to zero; and Equation (12) means that the product of the first positive frequency data $x_1$ and the conjugation of the second negative frequency data $y_2$ is not equal to the product of the conjugation of the first negative frequency data $x_2$ and the second positive frequency data $y_1$.

Then, the compensation unit 13 can compensate the negative frequency component of the third receiving signal 24 by the I-Q imbalance compensation parameter 40

$$\left(\text{i.e., } \frac{\beta(-k)}{\alpha^*(k)}\right)$$

calculated by the calculation unit 11 according to the following equation:

$$GZ_3(-k) = R_3(-k) - DR_3^*(k) \quad (13)$$

$$G = \alpha(-k) - \frac{\beta^*(k)\beta(-k)}{\alpha^*(k)}$$

where $Z_3(-k)$ is an ideal receiving data of the negative frequency component of the third receiving signal, $\alpha^*(k)$ is the conjugation of $\alpha(k)$, and $\beta^*(k)$ is the conjugation of $\beta(k)$.

It can be seen from Equation (13) that $Z_3(-k)$ is an ideal receiving data of the negative frequency component of the third receiving signal, and G is an eliminable gain value which can be removed by a decoder (not shown) of the receiver 1. Accordingly, the receiver 1 can eliminate the image aliasing caused by the I-Q channel imbalance effect through only one multiplication operation and one subtraction operation, thereby, simplifying the computation greatly. Likewise, the calculation unit 11 can also calculate $$\frac{\beta(k)}{\alpha^*(-k)}$$

according to the aforesaid steps so that the compensation unit 13 compensates the positive frequency component of the third receiving signal 24 according to $$\frac{\beta(k)}{\alpha^*(-k)}.$$

The aforesaid derivation for compensating the image aliasing caused by the I-Q channel imbalance effect is based on the assumption that there is no noise (i.e., in an ideal case). However, when taking into account the interference of noises, particularly in the case of a low signal-to-noise ratio, the aforesaid compensation for the image aliasing caused by the I-Q channel imbalance effect will be affected. In other words, the image aliasing caused by the I-Q channel imbalance effect cannot be effectively compensated by the I-Q imbalance compensation parameter 40

$$\left(\text{i.e., } \frac{\beta(k)}{\alpha^*(-k)} \text{ or } \frac{\beta(-k)}{\alpha^*(k)}\right)$$

calculated in the aforesaid way.

Therefore, the receiver 1 of this embodiment further takes into account the influence of noises. It can be known from the following derivation that the receiver 1 of this embodiment can minimize the influence of the noises. In other words, in the case of a low signal-to-noise ratio, the receiver 1 of this embodiment can still present a low computational complexity and a short latency and effectively compensate for the I-Q imbalance effect in modern wireless communication systems due to high-speed wireless transmission.

In detail, when taking into account the noises, Equation (3) can be expressed as $R'_p = R_p + n_p$ and Equation (4) can be expressed as $R'_n = R_n + n_n$, where each of $n_p$ and $n_n$ is a noise vector. Using the calculation of $$\frac{\beta(-k)}{\alpha^*(k)}$$

as an example, the vectors $b_1$ and $b_2$ must further satisfy the following conditions in addition to satisfying Equations (8), (9) and (10) to ensure that the influence of noises is minimized:

$$b_1(1)y_1 = b_1(2)x_1 \quad (14)$$

$$b_2(1)y^*{}_1 = b_2(2)x^*{}_1 \quad (15)$$

where $b_1 = [p_1 x_1 p_1 y_1]^T$, $b_2 = \text{conj}(b_1)$ and $p_1 \in \mathbb{C}$; and $b_2 = \text{conj}(b_1)$ means that $b_2$ is the conjugation of $b_1$, and $p_1 \in \mathbb{C}$ means that $p_1$ is a negative number.

Thus, for the vectors $b_1$ and $b_2$ to satisfy the conditions represented by Equations (8), (9), (10), (14) and (15) simultaneously, the first positive frequency data $x_1$, the first negative frequency data $x_2$, the second positive frequency data $y_1$ and the second negative frequency data $y_2$ must further satisfy the following condition in addition to satisfying the conditions represented by Equations (11) and (12):

$$x_1 x_2 = -y_1 y_2 \quad (16)$$

where Equation (16) means that: the product of the first positive frequency data $x_1$ and the first negative frequency data $x_2$ of the first receiving data 20 is equal to the negative value of the product of the second positive frequency data $y_1$ and the second negative frequency data $y_2$ of the second receiving data 22.

As the above conditions are satisfied, the calculation unit 11 can calculate $$\frac{\beta(-k)}{\alpha^*(k)}$$

according to the following equation:

$$D = \frac{\beta(-k)}{\alpha^*(k)} = \frac{b_1^T R_n'}{(b_2^T R_p')^*} \quad (17)$$

$$b_1^T R_n' = H\beta(-k) + n_1$$

$$b_2^T R_p' = H\alpha^*(k) + n_2$$

$$n_1 = b_1^T n_n$$

$$n_2 = b_2^T n_p$$

$$H = p_1(|x_x|^2 + |y_2|^2)$$

Then, the compensation unit 13 can, according to Equation (13), compensate for the negative frequency component of the third receiving signal 24 by the I-Q imbalance compensation parameter 40

$$\left(\text{i.e., } \frac{\beta(-k)}{\alpha^*(k)}\right)$$

calculated by the calculation unit 11. Thus, when taking noises into account, the receiver 1 can still eliminate the image aliasing caused by the I-Q channel imbalance effect through only one multiplication operation and one subtraction operation, thereby, simplifying the computation greatly and minimizing the influence of noises. Likewise, the calculation unit 11 can also calculate $$\frac{\beta(k)}{\alpha^*(-k)}$$

according to the aforesaid steps so that the compensation unit 13 compensates for the positive frequency component of the third receiving signal 24 according to $$\frac{\beta(k)}{\alpha^*(-k)}.$$

The second embodiment of the present invention is a receiver with I-Q imbalance compensation. The receiver of this embodiment is substantially the same as the receiver 1 of the first embodiment, but mainly differs in that the receiver of this embodiment calculates in such a way that the complex multiplication can be avoided during the calculation of the inner product of vectors. Therefore, the receiver of this embodiment presents a lower computational complexity as compared with the receiver 1 of the first embodiment.

Taking the calculation of $$\frac{\beta(-k)}{\alpha^*(k)}$$

as an example, the non-zero portions of the vectors $b_1$ and $b_2$ must be defined to be one of 1, −1, j or −j to lower the computational complexity of the receiver 1 by avoiding the complex multiplication during the calculation of the inner product of vectors. Therefore, the vectors $b_1$ and $b_2$ must further satisfy the following conditions in addition to satisfying Equations (8), (9) and (10):

$$b_1(1)y_1 = b_1(2)x_1 \quad (18)$$

$$b_2(1)y^*_1 = b_2(2)x^*_1 \quad (19)$$

where $$b_1 = p_1 \left[1 \frac{y_1}{x_1}\right]^T,$$

$b_2 = \text{conj}(b_1)$ and $p_1 \in C$; and $b_2 = \text{conj}(b_1)$ means that $b_2$ is the conjugation of $b_1$, and $p_1 \in C$ means that $p_1$ is a negative number.

Thus, in order for the vectors $b_1$ and $b_2$ to satisfy the conditions represented by Equations (8), (9), (10), (18) and (19) simultaneously, the first positive frequency data $x_1$, the first negative frequency data $x_2$, the second positive frequency data $y_1$ and the second negative frequency data $y_2$ must further satisfy the following conditions in addition to satisfying the conditions represented by Equations (11) (12) and (16):

$$\frac{y_1}{x_1} \in \{1, -1, j, -j\} \quad (20)$$

$$\frac{y_2}{x_2} \in \{1, -1, j, -j\} \quad (21)$$

where Equation (20) means that the ratio of the second positive frequency data $y_1$ of the second receiving signal 22 to the first positive frequency data $x_1$ of the first receiving signal 20 is equal to one of 1, −1, j and −j, and Equation (21) means that the ratio of the second negative frequency data $y_2$ of the second receiving signal 22 to the first negative frequency data $x_2$ of the first receiving signal 20 is equal to one of 1, −1, j and −j.

As the above conditions are satisfied, the calculation unit 11 can calculate $$\frac{\beta(-k)}{\alpha^*(k)}$$

according to the following equation:

$$D = \frac{\beta(-k)}{\alpha^*(k)} = \frac{b_1^T R_n'}{(b_2^T R_p')^*} \quad (22)$$

$$b_1^T R_n' = \frac{H}{x_1}\beta(-k) + n_1$$

-continued $$b_2^T R'_p = \frac{H}{x_1^*}\alpha^*(k) + n_2$$

$$n_1 = b_1^T n_n$$

$$n_2 = b_2^T n_p$$

$$H = p_1(|x_x|^2 + |y_2|^2)$$

Since the complex multiplication becomes unnecessary during the process of calculating $$\frac{\beta(-k)}{\alpha^*(k)}$$

according to the equation (22), the lower computational complexity is lowered as compared to $$\frac{\beta(-k)}{\alpha^*(k)}$$

which is calculated according to the equation (17). Similarly, the calculation unit 11 can calculate $$\frac{\beta(k)}{\alpha^*(-k)}$$

without the need of complex multiplication.

The third embodiment of the present invention is an I-Q imbalance compensation method for use in a receiver. The receiver described in this embodiment may be the receiver 1 of the first embodiment, so it may comprise a calculation unit and a compensation unit electrically connected to the calculation unit. This embodiment will be described with reference to FIG. 2, which is a flowchart diagram of the I-Q imbalance compensation method according to this embodiment.

Figure 2:
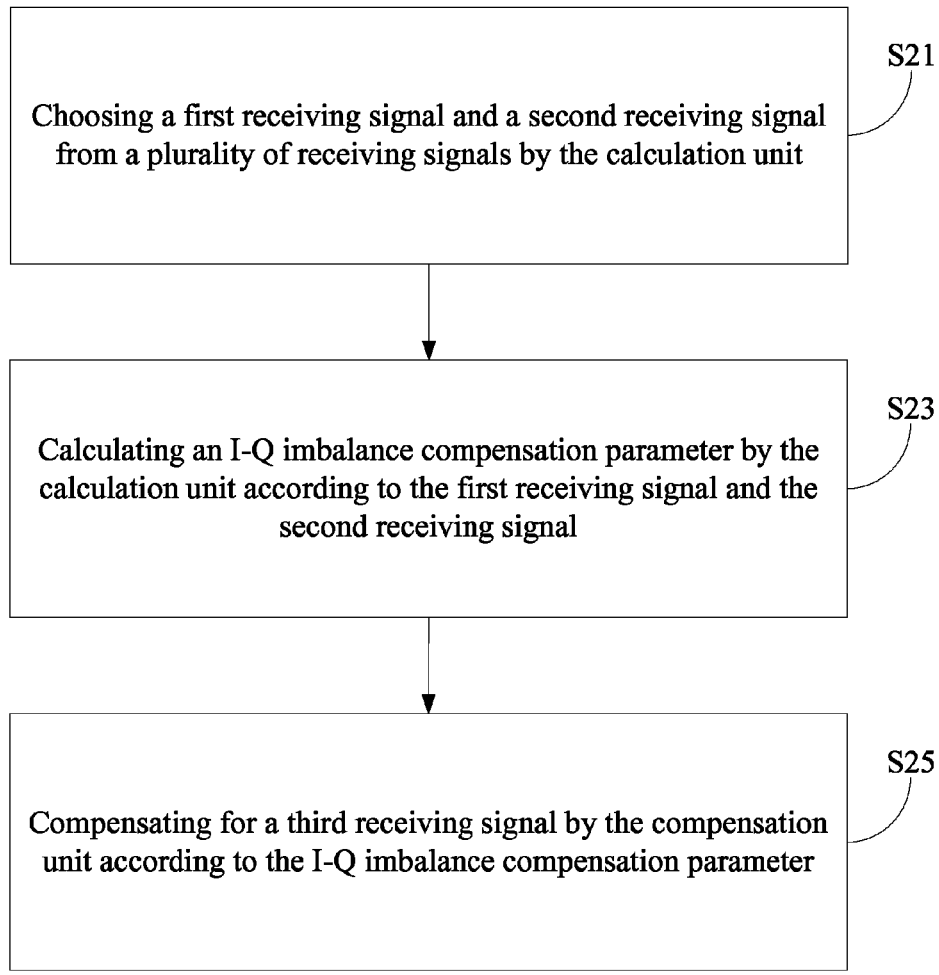
FIG. 2 is a flowchart diagram of the third embodiment of the present invention.

As shown in FIG. 2, in step S21, a first receiving signal and a second receiving signal are chosen from a plurality of receiving signals by the calculation unit. The first receiving signal comprises a first data and a first noise, while the second receiving signal comprises a second data and a second noise. The first data includes a first positive frequency data and a first negative frequency data, while the second data includes a second positive frequency data and a second negative frequency data.

In step S23, an I-Q imbalance compensation parameter is calculated by the calculation unit according to the first receiving signal and the second receiving signal. The first receiving signal and the second receiving signal have the same frequency. Each of the first positive frequency data, the first negative frequency data, the second positive frequency data and the second negative frequency data is not equal to zero. The product of the first positive frequency data and the conjugation of the second negative frequency data is not equal to the product of the conjugation of the first negative frequency data and the second positive frequency data. The product of the first positive frequency data and the first negative frequency data is equal to a negative value of the product of the second positive frequency data and the second negative frequency data.

In other embodiments, the first positive frequency data, first negative frequency data, the second positive frequency data and the second negative frequency data further satisfy the following conditions: the ratio of the second positive frequency data to the first positive frequency data is equal to one of 1, −1, j and −j; while the ratio of the second negative frequency data to the first negative frequency data is equal to one of 1, −1, j and −j.

In step S25, a third receiving signal is compensated by the compensation unit according to the I-Q imbalance compensation parameter. The third receiving signal has the same frequency as the first receiving signal and the second receiving signal.

It should be appreciated that in addition to the aforesaid steps, the third embodiment can also execute all the operations and functions set forth in the first embodiment and the second embodiment. The method in which the third embodiment executes these operations and functions will be readily appreciated by those of ordinary skill in the art based on the explanation of the first embodiment and the second embodiment, and thus, it will not be further described herein.

According to the above descriptions, the present invention provides a receiver with I-Q imbalance compensation and an I-Q imbalance compensation method thereof. The present invention effectively reduces the influences of noises and the LPF mismatch on the I-Q imbalance compensation by virtue of characteristics of two already-known signals that satisfy specific conditions. Therefore, even if taking into account noises and LPF mismatches, the receiver and the I-Q imbalance compensation method thereof disclosed in the aforesaid Taiwan Invention Patent Application can still present a low computational complexity and a short latency, as well as effectively compensate for the I-Q imbalance effect caused in the modern wireless communication systems due to high-speed wireless transmission.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A receiver with an Inphase-Quadrature (I-Q) imbalance compensation, comprising:
    a calculation unit, being configured to:
        choosing a first receiving signal and a second receiving signal from a plurality of receiving signals, wherein the first receiving signal comprises a first data and a first noise, the second receiving signal comprises a second data and a second noise, the first data includes a first positive frequency data and a first negative frequency data, and the second data includes a second positive frequency data and a second negative frequency data; and
        calculating an I-Q imbalance compensation parameter according to the first receiving signal and the second receiving signal; and
    a compensation unit, being electrically connected to the calculation unit and configured to compensate for a third receiving signal according to the I-Q imbalance compensation parameter;
    wherein the first receiving signal, the second receiving signal and the third receiving signal have the same frequency, each of the first positive frequency data, the first negative frequency data, the second positive frequency data and the second negative frequency data is not equal to zero, the product of the first positive frequency data and the conjugation of the second negative frequency data is not equal to the product of the conjugation of the first negative frequency data and the second positive frequency data, and the product of the first positive frequency data and the first negative frequency data is equal to a negative value of the product of the second positive frequency data and the second negative frequency data.

2. The receiver as claimed in claim 1, wherein the receiver conforms to an Orthogonal Frequency-Division Multiplexing (OFDM) standard.

3. The receiver as claimed in claim 1, wherein the ratio of the second positive frequency data to the first positive frequency data is equal to one of 1, −1, j and −j, and the ratio of the second negative frequency data to the first negative frequency data is equal to one of 1, −1, j and −j.

4. The receiver as claimed in claim 1, wherein each of the first receiving signal and the second receiving signal is one of a preamble signal, a synchronization signal, a reference signal and a pilot signal.

5. The receiver as claimed in claim 1, wherein the calculation unit calculates the I-Q imbalance compensation parameter according to a low-pass filter response of an inphase channel and a low-pass filter response of a quadrature channel, and a mismatch exists between the low-pass filter response of the inphase channel and the low-pass filter response of the quadrature channel.

6. An I-Q imbalance compensation method for use in a receiver, the receiver comprising a calculation unit and a compensation unit electrically connected to the calculation unit, the I-Q imbalance compensation method comprising the steps:

(a) choosing a first receiving signal and a second receiving signal from a plurality of receiving signals by the calculation unit, wherein the first receiving signal comprises a first data and a first noise, the second receiving signal comprises a second data and a second noise, the first data includes a first positive frequency data and a first negative frequency data, and the second data includes a second positive frequency data and a second negative frequency data;

(b) calculating an I-Q imbalance compensation parameter by the calculation unit according to the first receiving signal and the second receiving signal, wherein the first receiving signal and the second receiving signal have the same frequency, each of the first positive frequency data, the first negative frequency data, the second positive frequency data and the second negative frequency data is not equal to zero, the product of the first positive frequency data and the conjugation of the second negative frequency data is not equal to the product of the conjugation of the first negative frequency data and the second positive frequency data, and the product of the first positive frequency data and the first negative frequency data is equal to a negative value of the product of the second positive frequency data and the second negative frequency data; and (c) compensating for a third receiving signal by the compensation unit according to the I-Q imbalance compensation parameter, wherein the third receiving signal has the same frequency as the first receiving signal and the second receiving signal.

7. The I-Q imbalance compensation method as claimed in claim 6, wherein the receiver conforms to an Orthogonal Frequency-Division Multiplexing standard.

8. The I-Q imbalance compensation method as claimed in claim 6, wherein the ratio of the second positive frequency data to the first positive frequency data is equal to one of 1, −1, j and −j, and the ratio of the second negative frequency data to the first negative frequency data is equal to one of 1, −1, j and −j.

9. The I-Q imbalance compensation method as claimed in claim 6, wherein each of the first receiving signal and the second receiving signal is one of a preamble signal, a synchronization signal, a reference signal and a pilot signal.

10. The I-Q imbalance compensation method as claimed in claim 6, wherein the calculation unit calculates the I-Q imbalance compensation parameter according to a low-pass filter response of an inphase channel and a low-pass filter response of a quadrature channel, and a mismatch exists between the low-pass filter response of the inphase channel and the low-pass filter response of the quadrature channel.

* * * * *